UNITED STATES PATENT OFFICE.

ANTHONY E. MENUEZ, OF ST. PAUL, MINNESOTA, ASSIGNOR OF ONE-SEVENTH TO WALTER RUAN, OF SAME PLACE.

INSULATING COMPOSITION.

SPECIFICATION forming part of Letters Patent No. 438,698, dated October 21, 1890.

Application filed February 24, 1890. Serial No. 341,478. (No specimens.)

*To all whom it may concern:*

Be it known that I, ANTHONY E. MENUEZ, of St. Paul, Ramsey county, Minnesota, have invented certain Improvements in Insulating Compositions, of which the following is a specification.

My invention relates to improvements in insulating compositions adapted to be molded into any desired form and to serve as electric insulators, its object being to provide a composition which shall be inexpensive, easily molded, strong, and durable, and an efficient insulator; and it consists in the composition of matter hereinafter described, and particularly pointed out in the claims.

My improved composition consists of equal parts, by measure, of powdered mineral wool, powdered graphite, and asbestus fiber thoroughly mixed together, and liquid silicate of soda added thereto in sufficient quantity to form of the mass a thick paste. This paste can then be molded into any desired form to serve as insulating attachments of various kinds, and hardened by being dried or baked. In some cases the graphite may be omitted and equal parts of mineral wool and asbestus used, but without securing as efficient a composition.

The graphite is used for the purpose of giving body to the composition and assisting in solidifying and hardening it. A non-conductive clay or similar substance may be used efficiently to accomplish the same result in some cases, particularly where cheapness of manufacture is an important consideration. One of the best clays for this purpose is kaolin, which is in some cases from its high insulating quality nearly, if not quite, as efficient as the graphite.

The mineral wool and graphite, or the mineral wool alone, form an almost perfect insulating material, the asbestus fiber being compounded with it as an imperfect insulating material to give strength to the composition. This composition is of special value for use in making the insulating supports and attachments for electric-railway wires. When thus used and exposed to the weather, I prefer to give to the composition after being formed a suitable water-proof coating.

I claim—

1. The described composition of matter, consisting of powdered mineral wool, powdered graphite or a hardening-clay, asbestus fiber, and liquid silicate of soda, substantially as and in the proportions described.

2. The foregoing described composition of matter, consisting of powdered mineral wool, powdered graphite or a hardening-clay, asbestus fiber, and liquid silicate of soda, adapted to be molded into suitable form, and a suitable water-proof coating therefor, substantially as and for the purposes set forth.

3. A composition of matter, consisting of powdered mineral wool, asbestus fiber, and liquid silicate of soda, as and for the purposes set forth.

4. A composition of matter, consisting of powdered mineral wool, asbestus fiber, and silicate of soda, solidified into proper form and covered with a water-proof coating, substantially as and for the purposes set forth.

In testimony whereof, I have hereunto set my hand this 19th day of February, 1890.

ANTHONY E. MENUEZ.

In presence of—
T. D. MERWIN,
A. MAE WELCH.